(12) United States Patent
Tashiro

(10) Patent No.: US 7,371,433 B2
(45) Date of Patent: May 13, 2008

(54) COMPOSITION OF SILICON-CONTAINING COPOLYMER, SOLVENT-SOLUBLE CROSSLINKED SILICON-CONTAINING COPOLYMER, AND CURED ARTICLES OBTAINED THEREFROM

(75) Inventor: Yuji Tashiro, Shizuoka (JP)

(73) Assignee: AZ Electronic Materials USA Corp., Somerville, NJ (US)

( * ) Notice: Subject to any disclaimer, the term of this patent is extended or adjusted under 35 U.S.C. 154(b) by 678 days.

(21) Appl. No.: 10/506,855

(22) PCT Filed: Apr. 4, 2003

(86) PCT No.: PCT/JP03/04336

§ 371 (c)(1),
(2), (4) Date: Sep. 2, 2004

(87) PCT Pub. No.: WO03/087228

PCT Pub. Date: Oct. 23, 2003

(65) Prior Publication Data

US 2005/0123774 A1    Jun. 9, 2005

(30) Foreign Application Priority Data

Apr. 12, 2002   (JP)   ............... 2002-111128

(51) Int. Cl.
*B05D 3/02*   (2006.01)
(52) U.S. Cl. .................................... 427/387
(58) Field of Classification Search ............... None
See application file for complete search history.

(56) References Cited

U.S. PATENT DOCUMENTS

| | | | |
|---|---|---|---|
| 3,655,615 A | 4/1972 | Bush et al. | |
| 5,250,648 A | 10/1993 | Huggins | |
| 5,596,062 A | 1/1997 | Tashiro et al. | |
| 6,946,536 B2 * | 9/2005 | Tashiro | ................. 528/35 |
| 2004/0030083 A1 | 2/2004 | Tashiro | |

FOREIGN PATENT DOCUMENTS

| | | |
|---|---|---|
| EP | 218117 A2 | 4/1987 |
| JP | 62-88327 A | 4/1987 |
| JP | 5-170914 A | 7/1993 |
| JP | 8-231727 A | 9/1996 |
| JP | 8-245880 A | 9/1996 |
| JP | 9-188765 A | 7/1997 |
| JP | 9-188851 A | 7/1997 |
| JP | 11-195382 A | 7/1999 |
| JP | 2002-304949 A | 10/2002 |
| WO | WO 02/1081553 A1 | 10/2003 |

OTHER PUBLICATIONS

English language abstract of JP 8-245880 A.
English language abstract of JP 9-188765 A.
English language abstract of JP 9-188851 A.
English language abstract of JP 2002-304949 A.
English language abstract of JP 11-195382 A.
English language abstract of JP 2-175726 A.

* cited by examiner

*Primary Examiner*—Erma Cameron
(74) *Attorney, Agent, or Firm*—Alan P. Kass

(57) ABSTRACT

A composition comprising a silicon-containing copolymer having a number-average molecular weight of 500 to 1,000,000, having SiO bond in the polymer and containing at least the structural units represented by the following general formulae (I) and (II) and, if necessary, one or more of the structural units represented by the following general formulae (III) to (VII) and a cross-linking agent is reacted at −20 to 100° C. for 1 to 3 hours. The resultant reaction composition is coated on a substrate and cured by heating to a temperature of 150° C. or above, for example, 250° C. to obtain a cured product of a silicon-containing copolymer which has a high heat resistance, a high light transmission, a low relative dielectric constant and a high chemical resistance and which has a strong mechanical strength and a good flexibility.

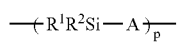 (I)

 (II)

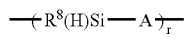 (III)

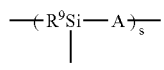 (IV)

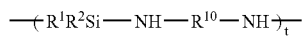 (V)

-continued

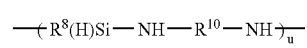 (VI)

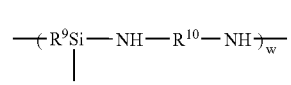 (VII)

wherein $R^1$ to $R^6$, $R^8$ and $R^9$ each independently represents an alkyl group, an alkenyl group, a cycloalkyl group, an aryl group, an aralkyl group, an alkylamino group, an alkylsilyl group or an alkoxy group, $R^7$ represents a divalent group, $R^{10}$ represents a divalent aromatic group, and A represents NH or O.

19 Claims, 1 Drawing Sheet

COMPOSITION OF SILICON-CONTAINING COPOLYMER, SOLVENT-SOLUBLE CROSSLINKED SILICON-CONTAINING COPOLYMER, AND CURED ARTICLES OBTAINED THEREFROM

This application is a United States National Stage Patent Application under 35 U.S.C. § 371 of International Patent Application No. PCT/JP03/04336, filed Apr. 4, 2003, which claims priority to Japanese Patent Application No. 2002-111128, filed Apr. 12, 2002.

TECHNICAL FIELD

The present invention relates to a silicon-containing copolymer composition containing a cross-linking agent, a silicon-containing copolymer cross-linked with a cross-linking agent, and a film or a coat which is constituted by the cross-linked, silicon-containing copolymer, which is excellent in heat resistance and transparency, and which has a low relative dielectric constant and has an excellent flexibility and an excellent mechanical strength and, further, to a plasma display panel (PDP) having the cured product of the silicon-containing copolymer composition as a dielectric layer, a partition (rib layer) and/or a vacuum sealer and a liquid crystal display (LCD) having the cured product as an interlayer dielectric film and/or an oriented film.

BACKGROUND ART

As to heat-resistant polymers, there have been studied fluorine-containing materials and aromatic or heterocyclic polymers such as polybenzimidazoles, aromatic polyamides and polyimides since synthesis of silicones by Rocho, et. al. Further, in recent years, with the development of technology in the space and aviation fields, demand for heat resistance has been increased, and the study has been advanced with respect to aromatic or heterocycyclic high polymers, with aromatic polyimides being under improvement. In addition to them, organometallic polymers having a main chain comprising metal element such as Si, Ti or B and O, N, etc. such as polyborosiloxane and polytitanosiloxane have been studied.

Also, in recent years, further improvement in heat resistance has been required with respect to heat-resistant and insulating materials to be used in various uses. For example, as one example of the heat-resistant and insulating materials, there is illustrated the field of high-pressure rotary machines such as generators, high-pressure alternating current motors, industrial direct current motors and motors for electric trains. These high-pressure rotary machines tend to come to be large-capacity-oriented and high-pressure-oriented and, at the same time, have been required to reduce size and acquire high heat resistance. Some of the heat-resistant and insulating materials in these fields are required to have a heat resistance of higher than 400° C. in the atmosphere and, at the same time, high insulating properties, high flexibility and high mechanical properties.

As other uses for the heat-resistant and insulating materials, there are illustrated various uses including an insulating or dielectric layer for displays such as PDP and LCD, an interlayer dielectric film for a thin film semiconductor device, materials for a semiconductor element such as Pre-Metal-Dielectric Layer (PMD) adapted for a 600° C. low-temperature process, front panels for displays, heat-resistant films, heat-resistant sheets or heat-resistant coatings for use in various uses, plastic optical fibers, heat-resistant and insulating threads, and electric wire coating. In these uses, some materials are required to have optical and electric properties such as transparency and dielectric properties in addition to the above-described heat resistance, flexibility and mechanical properties. Further, additional uses thereof in the field of ceramics composite materials, ceramic-metal adhesives, high-performance products with materials such as ceramic materials such as $Al_2O_3$ or MgO, or high-performance products obtained by blending with other polymer have been tried as well. However, as to organic polymers, heat-resistant polymers at present available have a practical heat-resistant temperature as low as 300° C. or less.

On the other hand, organometallic polymers such as silicone resins and polyborosiloxane resins have a high heat resistance as high as 500° C. or above due to thermal stability of the polymers. However, while the organic polymers have a molecular structure of a linear structure with less branching, the organometallic polymers have a network structure with more branching wherein a huge three-dimensional network structure is formed by dehydrogenation reaction or oxidation reaction between OH groups and, thus, they have such a poor flexibility that their uses have been limited.

In order to solve the defect with the organometallic polymers, it has been attempted to make a composite material between an organic resin and an inorganic material. For example, a block copoly-silazane composed of an inorganic polysilazane moiety and an organic polysilazane moiety has been proposed (for example, JP-A-2-175726). However, such composite polymer yet has a problem of, for example, insufficient mechanical properties, thus still not being satisfactory.

With such circumstances in mind, the inventor has formerly developed and proposed a highly heat-resistant, silicon-containing copolymer comprising silazane copolymer containing a specific repeating unit (JP-A-8-231727 and JP-A-9-188765). This silicon-containing copolymer is an organometallic polymer having a heat resistance of 400° C. or higher, an excellent mechanical properties and an excellent flexibility, which can be produced with ease and has the property of becoming transparent upon being cured in a nitrogen gas. Therefore, it is a useful material for highly heat-resistant optical use. However, when cured in the atmosphere, there results a colored polymer, thus there arises a problem that a film with a good transparency is difficult to obtain. Accordingly, the silicon-containing copolymer requires to be cured in a nitrogen gas in order to obtain a transparent cured polymer, which sometimes makes it difficult to apply the polymer to actual uses in view of process cost and mass production.

As a result of investigation, the inventor has formerly developed a silicon-containing copolymer which does not involve the problem of coloration upon curing by heating in the atmosphere, which has a heat resistance of 400° C. or higher, which has an excellent mechanical strength and an excellent flexibility, and which has a high transparency and a low relative dielectric constant, and filed an application on the polymer as Japanese Application No. 2001-99092 (JP-A-2002-293941, WO/02/081553). The silicon-containing copolymer proposed in this Japanese Patent Application No. 2001-99092 is transparent and has an excellent heat resistance and a low dielectric constant, and hence it might find application as flat panel displays (FDP) as well as conventional application to formation of heat-resistant films, hard coating films or insulating films. PDP having a baked film of the silicon-containing copolymer proposed in Japanese Patent Application No. 2001-99092 as a dielectric layer for covering a transparent electrode or an address electrode has been filed as Japanese Patent Application No. 2001-108593 (JP-A-2002-304949). However, the silicon-containing copolymer has a curing temperature of as high as about 400° C. In the case of using the cured silicon-containing copolymer as, for example, a material for various film-forming materials for LCD or PDP or a sealing material, the curing temperature is in many cases required to be 250° C. or lower in the process for producing LCD or PDP, thus the aforesaid polymer which requires curing at a temperature of 350° C. or higher not being usable in some cases. If the curing temperature of the polymer can be decreased to 250° C. or lower, it can find application to most of FPD uses such as LCD and PDP, thus serving to acquire an increased utility. Also, the polymer is required to be improved with respect to chemical resistance such as alkali resistance. Further, heat resistance, mechanical properties, flexibility, transparency and relative dielectric constant of the polymer are required to be more improved in comparison with those of conventional polymers. Also, materials which allow to form a coat having a more thickness by one coating are required. Further, in forming a dielectric layer or the like for PDP, a process of heating at a high temperature under a reduced pressure is unavoidable, and thus the silicon-containing copolymer proposed in Japanese Patent Application No. 2001-99092 is required to have a more improved durability against high-temperature heating under reduced pressure so that, when heated to a high temperature under reduced pressure, generation of, for example, no gases takes place.

An object of the invention is to provide a silicon-containing copolymer composition and a partially cross-linked, solvent-soluble, silicon-containing copolymer formed from the composition which solve the above-described problems, that is, which can be cured at a lower temperature, which possess a high transparency even when cured in the atmosphere, which have a heat resistance against heating to 400° C. or higher, particularly under reduced pressure, and which can form a film or a coat showing a high chemical resistance and a low relative dielectric constant.

Another object of the invention is to provide a partially cross-linked, silicon-containing copolymer which has the above-described properties and which allows to form a film or a coat having a more thickness by one coating and thus having an excellent mechanical strength and an excellent flexibility, and to provide a silicon-containing copolymer composition to be used for forming the partially cross-linked silicon-containing polymer.

A further object of the invention is to provide a method for curing the above-described composition or the above-described solvent-soluble, cross-linked, silicon-containing copolymer, to provide a film or a coat having an excellent heat resistance, an excellent chemical resistance, an excellent transparency and a low dielectric constant and to provide a display such as a plasma display panel (PDP) using a cross-linked, silicon-containing copolymer including such film or coat as a dielectric layer, a partition (rib layer) and/or a vacuum-sealing agent or a liquid crystal display (LCD) using these as an interlayer dielectric film/ and or an oriented film, or a semiconductor device having the cross-linked, silicon-containing copolymer as a layer-constituting member.

DISCLOSURE OF THE INVENTION

As a result of intensive investigations, the inventor has found that the problems with the silicon-containing copolymer which has been proposed by the inventor in the Japanese Patent Application No. 2001-99092, which is not colored even when cured in the atmosphere, and which is excellent in heat resistance, transparency and dielectric properties, that is, the high curing temperature and insufficient heat resistance and chemical resistance under reduced pressure of the silicon-containing copolymer, can be solved by using the polymer in combination with a cross-linking agent capable of reacting with a slight amount of water in the atmosphere to form bond with the polymer, thus having completed the invention.

That is, the invention comprises the following constitution.

[1] A silicon-containing copolymer composition, which comprises a silicon-containing copolymer having a number-average molecular weight of 500 to 1,000,000 and containing at least the structural units represented by the following general formulae (I) and (II) and a cross-linking agent:

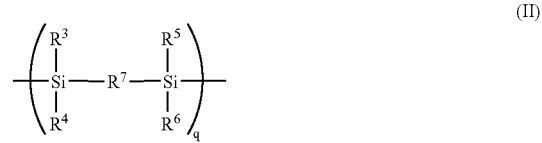

wherein $R^1$, $R^2$, $R^3$, $R^4$, $R^5$ and $R^6$ each independently represents an alkyl group, an alkenyl group, a cycloalkyl group, an aryl group, an aralkyl group, an alkylamino group, an alkylsilyl group or an alkoxy group, $R^7$ represents a divalent group, and A represents NH or O, with the order of the structural units (I) and (II) being at random, and the molar ratios p and q thereof respectively being an optional number except for zero, and the proportions of Si—O bond and Si—N bond in the copolymer satisfying the following equation:

Si—O/(Si—N+Si—O)=0.01 to 0.99.

[2] The silicon-containing copolymer composition as described in the above [1], wherein the silicon-containing copolymer further contains at least one of the structural units represented by the following general formulae (III) and (IV):

wherein $R^8$ and $R^9$ each independently represents an alkyl group, an alkenyl group, a cycloalkyl group, an aryl group, an aralkyl group, an alkylamino group, an alkylsilyl group or an alkoxy group, and A represents NH or O, with the order of the structural units (I) to (IV) in the polymer being at random, and the molar ratios thereof, p, q, r and s satisfying the following equation:

$$q/(p+q+r+s)=0.01 \text{ to } 0.99.$$

[3] The silicon-containing copolymer composition as described in the above [1] or [2], wherein the silicon-containing copolymer further contains at least one of the structural units represented by the following general formulae (V), (VI) and (VII):

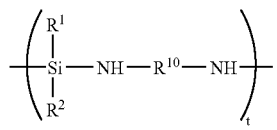 (V)

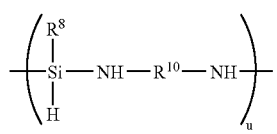 (VI)

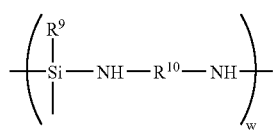 (VII)

wherein $R^1$, $R^2$, $R^8$ and $R^9$ each independently represents an alkyl group, an alkenyl group, a cycloalkyl group, an aryl group, an aralkyl group, an alkylamino group, an alkylsilyl group or an alkoxy group, $R^{10}$ represents a divalent aromatic group, with the order of the structural units (V) to (VII) in the polymer being at random, and t, u and w respectively being an optional number except for zero.

[4] The silicon-containing copolymer composition as described in any one of the above [1] to [3], wherein the divalent aromatic group is an aralkylene group, a naphthylene group or a group represented by the following general formula (A):

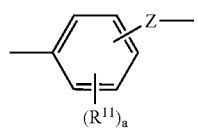 (A)

wherein $R^{11}$ represents a halogen atom or a lower alkyl group, a represents an integer of 0 to 4, and Z represents a direct bond or a group represented by the following general formula (B):

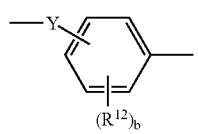 (B)

wherein $R^{12}$ represents a halogen atom or a lower alkyl group, b represents an integer of 0 to 4, and Y represents a direct bond or a divalent group.

[5] The silicon-containing copolymer composition as described in any one of the above [1] to [4], wherein the cross-linking agent is a silicon-containing cross-linking agent.

[6] The silicon-containing copolymer composition as described in the above [5], wherein the silicon-containing cross-linking agent is at least one member selected from among tetraisocyanatesilane, triisocyanatesilane, tetraalkoxysilane and trialkoxysilane.

[7] The silicon-containing copolymer composition as described in any one of the above [1] to [6], which further contains a cross-linking accelerator.

[8] The silicon-containing copolymer composition as described in any one of the above [1] to [4], wherein the cross-linking agent is a compound capable of generating an acid upon being heated.

[9] The silicon-containing copolymer composition as described in the above [8], wherein the compound capable of generating an acid upon being heated is a peroxide having a benzene ring or rings.

[10] The silicon-containing copolymer composition as described in the above [9], wherein the peroxide is 3,3',4,4'-tetra(t-butylperoxycarbonyl)benzophenone or the derivative thereof.

[11] A cross-linked silicon-containing copolymer formed by heating the silicon-containing copolymer composition described in any one of the above-described [1] to [10].

[12] The cross-linked silicon-containing copolymer as described in the above [11], wherein the cross-linked silicon-containing copolymer is solvent-soluble.

[13] A process for curing a silicon-containing copolymer, which comprises heating the silicon-containing copolymer composition described in any one of the above [1] to [10] at a temperature of 150° C. or higher than that.

[14] A process for curing the solvent-soluble, cross-linked, silicon-containing copolymer described in the above [12], which comprises coating a solvent solution of the solvent-soluble, cross-linked, silicon-containing copolymer on a substrate, and heating at a temperature of 150° C. or higher than that.

[15] A film or coat formed by heat-curing according to the process described in the above [13] or [14].

[16] A plasma display which has the cross-linked cured product of the silicon-containing copolymer composition described in any one of the above [1] to [10] as a dielectric layer, a partition (rib layer) and/or a vacuum sealer.

[17] A liquid crystal display which has the cross-linked cured product of the silicon-containing copolymer composition described in any one of the above [1] to [10] as an interlayer dielectric film and/or an oriented film.

Further, the invention provides, as more preferred embodiments, a silicon-containing copolymer composition and a solvent-soluble, cross-linked, silicon-containing copolymer including the following embodiments.

(1) The aforesaid silicon-containing copolymer composition or the solvent-soluble, cross-linked, silicon-containing copolymer wherein $R^1$ to $R^6$, $R^8$ and $R^9$ in the above structural units of the general formulae of (I) to (VII) each independently represents a methyl group or a phenyl group.

(2) The aforesaid silicon-containing copolymer composition or the solvent-soluble, cross-linked, silicon-containing copolymer wherein $R^7$ and $R^{10}$ in the above structural units of the general formulae of (II) and (V) to (VII) each independently represents an arylene group.

Also, the silicon-containing copolymer composition or the solvent-soluble, cross-linked silicon-containing copolymer of the invention is used in an embodiment of a form such as a coat formed by coating it on a proper substrate and then curing by heat or a molding formed by casting it and then curing by heat. Such cured products are used as a general heat-resistant material or a general heat-resistant layer, or as a hard coating film due to their excellent heat resistance. In addition to these, they may find application to, for example, the following uses or embodiments due to their low dielectric constant, colorless and transparent properties, large mechanical strength, and excellent chemical resistance such as alkali resistance.

(a) Dielectric layer for use as a PDP front panel and a PDP back panel, material for a PDP rib (partition), and a PDP vacuum sealer.
(b) FPD panel sealer.
(c) Interlayer dielectric film and oriented film for LCD.
(d) Buffer coat and protective film for use in post processes for semiconductor elements.
(e) Interlayer dielectric film for a semiconductor.
(f) Alkali-resistant coating in an ink jet printer.
(g) Front display panel for a display element.
(h) PMD materials adapted for a 600° C. low-temperature process.
(i) Optical fibers.
(j) Heat-resistant adhesives and heat-resistant paints.
(k) Wire coating.
(l) Composite materials with ceramics.
(m) Heat-resistant insulating threads.

DETAILED DESCRIPTION OF THE INVENTION

Figure 1:
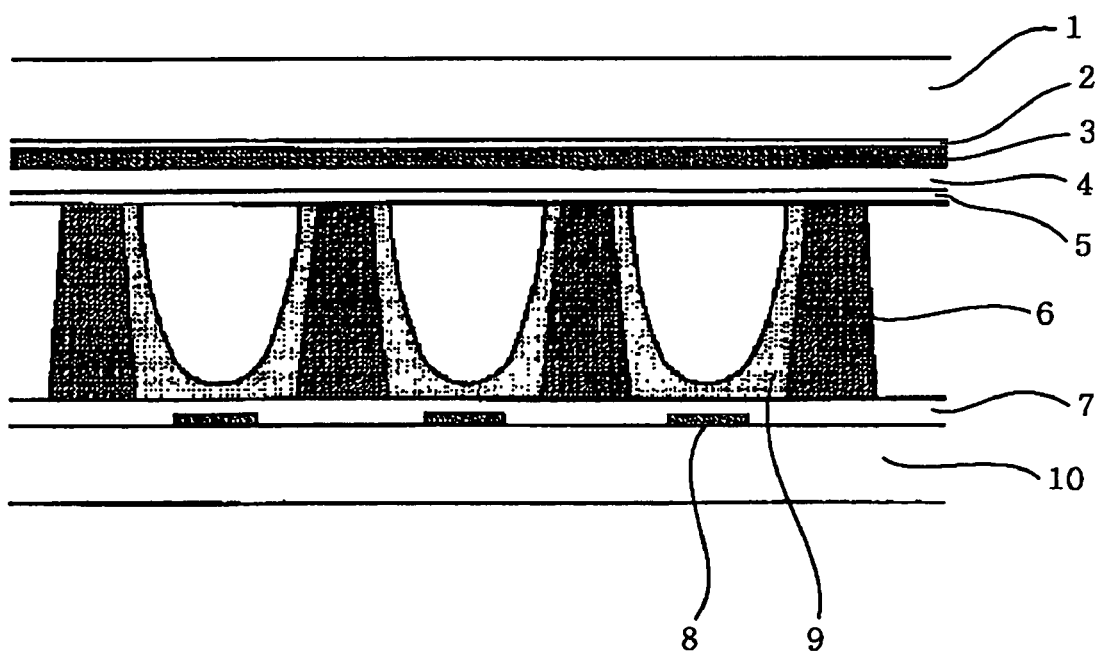
FIG. 1 is a schematic cross-sectional view showing an AC plasma display panel having a dielectric layer formed by using a cured film of the solvent-soluble, cross-linked, silicon-containing polymer of the invention.

The present invention is described in more detail below.

The solvent-soluble or solvent-insoluble, cross-linked silicon-containing copolymer of the invention is produced by cross-linking a silicon-containing copolymer having the structural units of the foregoing general formulae (I) and (II) or having the structural units of (I) and (II) and at least one of the structural units represented by the general formulae (III) to (VII) and having a number-average molecular weight of 500 to 1,000,000 (hereinafter also referred to as "base polymer") with a cross-linking agent or by cross-linking and curing. It depends on various factors such as heating temperature, heating period, kind and amount of the cross-linking agent and, in the case of using a cross-linking accelerator, kind and amount of the cross-linking accelerator whether the base polymer becomes a solvent-soluble polymer or a solvent-insoluble cured product as a result of further cross-linking and curing.

For example, cross-linking for producing the solvent-soluble, cross-linked, silicon-containing copolymer is usually conducted at a proper temperature of, for example, −20 to 100° C. in a state wherein the base polymer, the cross-linking agent and, if necessary, other additives such as the cross-linking accelerator are dissolved in a solvent. Therefore, upon production of the solvent-soluble, cross-linked, silicon-containing copolymer, heating may not be conducted or, if necessary, may be conducted. The reaction time may be properly selected depending upon the reaction temperature. For example, in the case of conducting the reaction under heating, the reaction time is usually about 1 to about 3 hours.

The solvent-soluble, cross-linked, silicon-containing copolymer obtained by this cross-linking reaction is coated on, for example, a substrate and further heated (baked) at a temperature where cross-linking further advances and curing initiates, for example, at 150° C. or higher to make a cured product. The thus-obtained cured product has excellent properties such as excellent heat resistance, mechanical strength, transparency, insulating properties (dielectric properties) and chemical resistance, and hence it can find various applications as described above.

Additionally, the temperature at which the cured product is obtained depends upon kind of the used base polymer, kind of the cross-linking agent and, in the case of using the cross-linking accelerator, kind of the cross-linking accelerator. For example, in the case of using 3,3',4,4'-tetra(t-butylperoxycarbonyl)benzophenone to be described hereinafter as the cross-linking agent, this cross-linking agent is decomposed at 150° C. and curing is initiated. Thus, although the lower limit of the cross-linking and curing temperature in the invention is not particularly limited as long as a cured product is obtained, the cross-linking and curing temperature may usually be 150° C. or higher. In order to conduct the curing more completely, it is usually preferred to conduct the curing at a higher temperature of, for example, 200° C. or higher, and temperature of about 250° C. is more preferred.

Further, in the invention, the cross-linking reaction includes those wherein the cross-linking agent reacts with one silicon-containing copolymer molecule, i.e., those wherein the cross-linking agent is added to the silicon-containing copolymer molecule in addition to those wherein two or more silicon-containing copolymer molecules are cross-linked with each other by the cross-linking agent. Therefore, in the case of referring to solvent-soluble, cross-linked, silicon-containing copolymers, there are also included cross-linkable silicon-containing copolymers wherein the cross-linking agent is bound to one silicon-containing copolymer molecule.

(Base Polymer)

The base polymer to be used in the silicon-containing copolymer composition of the invention is further described below. The base polymer to be used upon production of the solvent-soluble or solvent-insoluble, cured, cross-linked, silicon-containing copolymer has the structural unit represented by the foregoing general formula (II) or, in some cases, further structural units represented by (V) to (VII). The base polymer to be used in the invention has a bond energy increased by the C=C bond contained in these structural units and has an advanced straight-chain property due to introduction of a bifunctional group ($R^7$ and, in some cases, $R^{10}$). Of course, the base polymer has high oxidation stability due to Si bond, and hence the cured polymer obtained by curing the polymer has a heat resistance as high as 400° C. or higher and also has a good flexibility. In addition, since the polymer has the structural unit represented by the foregoing general formula (IV) and, in some cases, the structural unit of the general formula (VII), it has a high mechanical strength. Further, curing of the polymer proceeds upon being heated due to existence of the —NH— group in the foregoing general formulae (I) and (III) to (VII) and Si—H in the general formulae (III) and (VI) to provide a cured product having a more heat resistance and a more strength. In addition, existence of Si—O bond serves to form a cured polymer having excellently colorless and transparent properties and, even when cured in the atmosphere, it provides a cured polymer having excellently colorless and transparent properties. Existence of the structural units of the general formulae (III) and (VI) having Si—H and the structural units of the general formulae (I) and (III) to (VII) having —NH— serves to facilitate control of the curing upon heat-curing.

Additionally, the order of respective structural units of the general formulae (I) to (VII) in the polymer are at random, and the ratios of respective structural elements, p, q, r and s, or p, q, r, s, t, u and w may usually be within the following ranges:

$p/(p+q+r+s)=0.01$ to 0.99, preferably 0.1 to 0.5

$q/(p+q+r+s)=0.01$ to 0.99, preferably 0.2 to 0.75

$r/(p+q+r+s)=0$ to 0.99, preferably 0.01 to 0.2

$s/(p+q+r+s)=0$ to 0.99, preferably 0.1 to 0.5 or $p/(p+q+r+s+t+u+w)=0.01$ to 0.99, preferably 0.1 to 0.5

$q/(p+q+r+s+t+u+w)=0.01$ to 0.99, preferably 0.1 to 0.75

$(t+u+w)/(p+q+r+s+t+u+w)=0$ to 0.99, preferably 0.01 to 0.5

$(r+u)/(p+q+r+s+t+u+w)=0$ to 0.99, preferably 0.01 to 0.2

$(s+w)/(p+q+r+s+t+u+w)=0$ to 0.99, preferably 0.1 to 0.75.

Further, ratios of the Si—O bond and the Si—N bond in the polymer satisfy the following equation:

Si—O/[(Si—N)+(Si—O)]=0.01 to 0.99, preferably 0.1 to 0.95.

The base polymer may be produced by any process. As a preferred production process, there is illustrated a process of reacting a mixture containing an organopolyhalosilane represented by the following general formula (VIII):

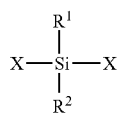
(VIII)

wherein $R^1$ and $R^2$ are as defined above, and X represents a halogen atom, a disilyl compound represented by the general formula (IX):

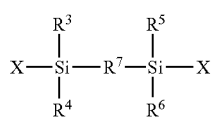
(IX)

wherein $R^3$ to $R^7$ and X are as defined above and, if necessary, an organopolyhalosilane represented by the general formula (X):

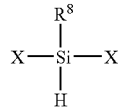
(X)

wherein $R^8$ and X are the same as defined above and/or the general formula (XI):

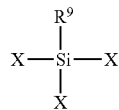
(XI)

wherein $R^9$ and X are as defined above first with, if necessary, a diamine represented by the general formula (XII):

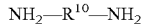
(XII)

wherein $R^{10}$ is as defined above, then with water dispersed in a proper solvent, and then with ammonia to completely react unreacted halosilane.

In the organopolyhalosilanes represented by the above general formula (VIII), (X) or (XI) to be used as starting materials for producing the base polymer of the silicon-containing copolymer to be used in the invention, $R^1$, $R^2$, $R^8$ and $R^9$ are selected from among an alkyl group, an alkenyl group, a cycloalkyl group, an aryl group, an aralkyl group, an alkylamino group, an alkylsilyl group and an alkoxy group, and usually from among an alkyl group containing 1 to 7, preferably 1 to 5, more preferably 1 to 2 carbon atoms, an alkenyl group containing 2 to 7 carbon atoms, a cycloalkyl group containing 5 to 7 carbon atoms, and an aryl group. In the general formulae, X is usually a fluorine atom, a chlorine atom, a bromine atom or an iodine atom, preferably a chlorine atom. Examples of the aryl group include a phenyl group, a tolyl group, a xylyl group, a cumenyl group, a benzyl group, a phenethyl group, an α-methylbenzyl group, a benzhydryl group, a trityl group, a styryl group, a cinnamyl group, a biphenyl group and a naphthyl group. Further, as the alkylsilyl group (mono-, di- or tri-substituted), the alkylamino group (mono- or di-substituted) and the alkoxy group, those containing 1 to 7 carbon atoms are usually used. Additionally, $R^1$ and $R^2$ may be the same or different from each other. A preferred compound represented by the general formula (VIII) is diphenyldichlorosilane, a preferred compound represented by the foregoing general formula (X) is methyldichlorosilane, and a preferred compound represented by the foregoing general formula (XI) is phenyltrichlorosilane.

On the other hand, $R^3$ to $R^6$ of the disilyl compound represented by the general formula (IX) to be used as a starting material upon production of the silicon-containing copolymer in the invention is selected from among an alkyl group, an alkenyl group, a cycloalkyl group, an aryl group, an aralkyl group, an alkylamino group, an alkylsilyl group or an alkoxy group, as is the same with $R^1$, $R^2$, $R^8$ and $R^9$ in the general formulae (VIII), (X) and (XI), and X represents a halogen atom. Specific examples of these groups or atoms are the same as those illustrated with respect to $R^1$, $R^2$, $R^8$ and $R^9$ in the organopolyhalosilane represented by the general formulae (VIII), (X) and (XI). As the divalent group of $R^7$, divalent aromatic groups such as an aralkylene group, a naphthylene group or the group represented by the foregoing general formula (A) are preferred. Examples of $R^7$ include an alkylene group, an alkenylene group, a cycloalkylene group, an arylene group, an alkylimino group or an alkylsilylene group, and the arylene group is preferred.

Also, examples of the arylene group include a phenylene group, a tolylene group, a xylylene group, a benzylidene group, a phenethylidene group, an α-methylbenzylidene group, a cinnamylidene group and a naphthylene group.

A specific preferred example of the compound represented by the general formula (IX) is 1,4-bis(dimethylchlorosilyl)benzene.

In producing the base polymer, as has been described hereinbefore, a mixture of the organopolyhalosilane and the disilyl compound is, if necessary, first reacted with a diamine represented by the general formula (XII) of $NH_2$—$R^{10}$—$NH_2$. $R^{10}$ in the general formula (XII) is a divalent aromatic group, and is preferably an aralkylene group, a naphthylene group or the group represented by the foregoing general formula (A).

Specific examples of the diamine represented by the general formula (XII) are illustrated below. As $R^{10}$, there are illustrated various divalent aromatic groups such as an arylene group (e.g., a phenylene group) and a biphenylene group, and the arylene group is preferred. Additionally, all of those compounds which are illustrated below are merely illustrative of compounds preferred as the diamine represented by the general formula (XII), and are not to be construed as limiting the diamine represented by the general formula (XII) of the invention to the following illustrative compounds.

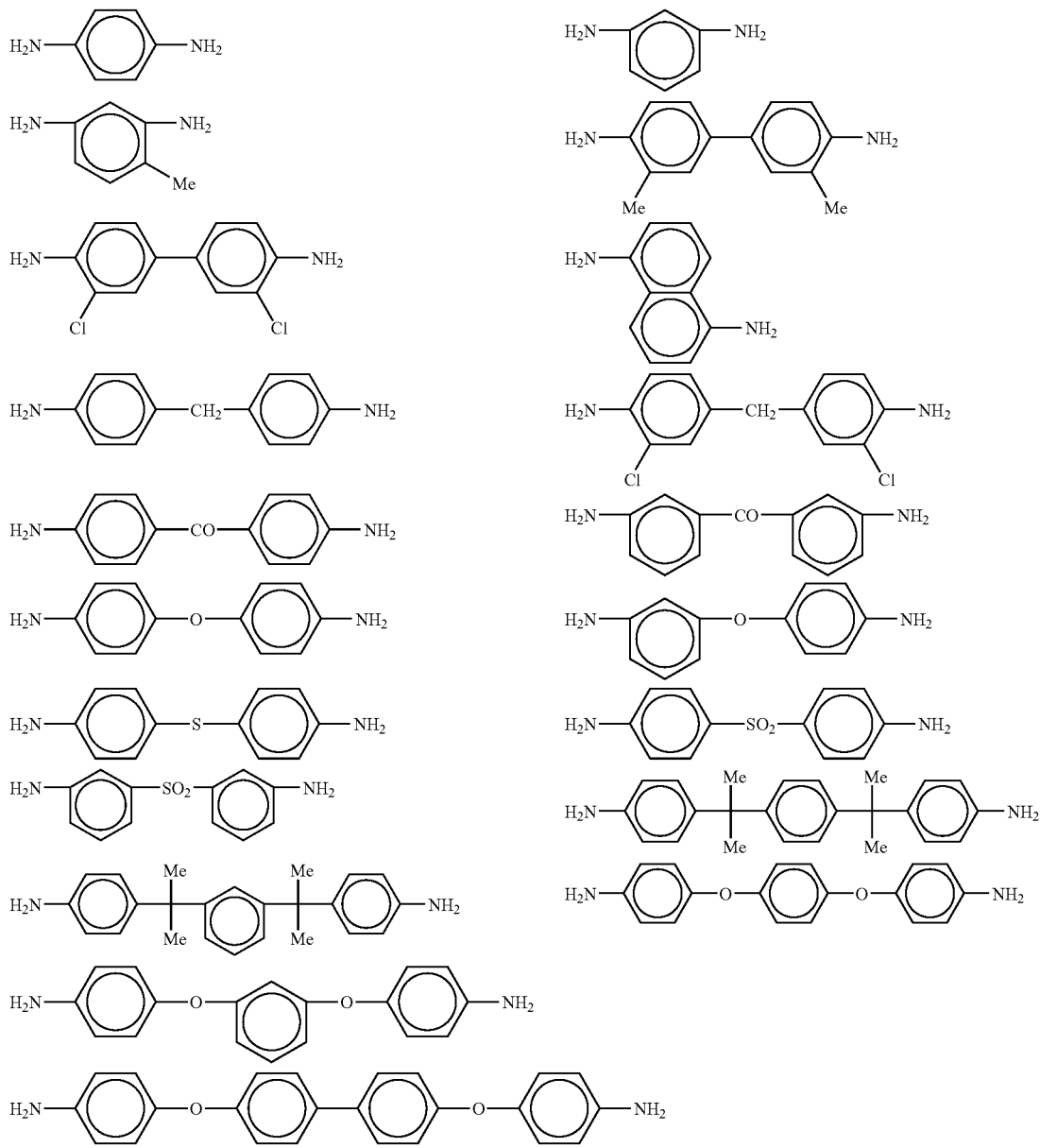

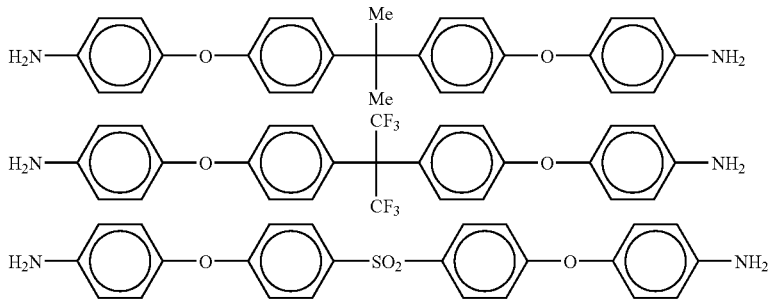

Of these diamines, p-phenylenediamine (p-PDA), m-phenylenediamine (m-PDA) and 4,4'-diphenyldiaminoether (oxydianiline; ODA) are preferred.

As the reaction solvent, any of Lewis bases and non-reactive solvents may be used independently or as a mixture. In this case, examples of the Lewis bases include tertiary amines (e.g., trialkylamines such as trimethylamine, dimethylethylamine, diethylmethylamine and triethylamine, pyridine, picoline, dimethylaniline and the derivatives thereof), secondary amines having a steric hindrance group, phosphine, stibine, arsine and derivatives thereof (e.g., trimethylphosphine, dimethylethylphosphine, methyldiethylphosphine, triethylphosphine, trimethylarsine, trimethylstibine, trimethylamine, triethylamine, etc.). Among them, those bases which have a low boiling point and a smaller basicity than ammonia (e.g., pyridine, picoline, trimethylphosphine, dimethylethylphosphine, methyldiethylphosphine or triethylphosphine) are preferred, and pyridine and picoline are particularly preferred in view of handling ease and economical advantage.

As the non-reactive solvent, hydrocarbon solvents such as aliphatic hydrocarbons, alicyclic hydrocarbons and aromatic hydrocarbons; halogenated hydrocarbons such as halogenated methane, halogenated ethane and halogenated benzene; and ethers such as aliphatic ethers and alicyclic ethers may be used. Of these, preferred examples include halogenated hydrocarbons such as methylene chloride, chloroform, carbon tetrachloride, bromoform, ethylene chloride, ethylidene chloride, trichloroethane and tetrachloroethane; ethers such as ethyl ether, isopropyl ether, ethyl butyl ether, butyl ether, 1,2-dioxyethane, dioxane, dimethyldioxane, tetrahydrofuran and tetrahydropyran; and hydrocarbons such as pentane, hexane, isohexane, methylpentane, heptane, isoheptane, octane, isooctane, cyclopentane, methylcyclopentane, cyclohexane, methylcyclohexane, benzene, toluene, xylene, ethylbenzene, N-methyl-2-pyrrolidone and diglyme. Of these solvents, dichloromethane, xylene and N-methyl-2-pyrrolidone are preferred in view of safety. Also, a pyridine/dichloromethane mixed solvent is preferred.

In the above-described production process, organopolyhalosilanes represented by the foregoing general formulae (VIII), (X) and, if necessary, (XI) are first mixed with a disilyl compound represented by the general formula (IX) in an organic solvent, and then the mixture is reacted first with, if necessary, a diamine represented by the foregoing general formula (XII). The mixing ratio of the organopolyhalosilanes to the disilyl compound may be in a range of from 1:99 to 99:1 in terms of molar ratio, preferably from 90:10 to 10:90, more preferably from 80:20 to 40:60. The using ratio of the two halosilicon compounds to the diamine may be in the range of from 100:0 to 10:90 in terms of molar ratio, preferably from 100:0 to 25:75, more preferably from 100:0 to 40:60. As to the amine-modification amount by the diamine, 0 to 50 mol % based on the theoretical reaction amount of the both halosilicon compounds is preferred. The concentration of the halosilicon compound in the solvent may freely be selected, but is preferably in the range of from 1 to 25% by weight. As to reaction temperature, any temperature may suffice as long as the reaction system becomes liquid (typically −40° C. to 300° C.). Also, as to pressure, the reaction is conducted generally under ordinary pressure or under pressure, and is preferably conducted under the pressure of nitrogen.

After conducting the reaction between the halosilicon compounds and the diamine, or without conducting the reaction with the diamine, water dispersed in a proper solvent is added to the halosilicon compounds to react and form Si—O bond. As the solvent for dispersing water, the same solvent as is used for the reaction with the above-described diamine may be used. Particularly, pyridine and picoline are preferred in view of handling ease and economical advantage. Also, in the reaction with water, the rate of pouring water into the reaction system exerts a great influence upon generation of the polymer. In case where the pouring rate is too fast, formation of the polymer becomes insufficient in some cases. The rate of pouring water is desirably 0.1 mol $H_2O$/min or less. Further, the reaction temperature plays an important role in formation of the polymer. The temperature for the hydrolysis reaction is usually −40° C. to 20° C., more preferably −20° C. to 5° C. In case where the reaction temperature is too high, there results, in some cases, insufficient formation of the polymer.

After completion of the reaction with water, ammonia is added to conduct aminolysis reaction for completely reacting the halosilanes. The reaction solvent and the reaction conditions such as reaction temperature are the same as with the diamine used in the preceding step. The amount of ammonia to be added is determined by the amount of remaining unreactred halogen atom. That is, the theoretical amount necessary for ammonolysis of the halosilicon compounds can be calculated based on the amounts of added diamine and water. However, since ammonia is permitted to be excessive, ammonia is added usually in an amount more than the theoretical amount. As to reaction pressure, the reaction is conducted generally under atmospheric pressure or under pressure, and preferably under pressure with nitrogen. This reaction involves generation of HCl, which may be separated from the end product as a salt with a base such as triethylamine or ammonia. The thus-produced copolymer is separated from the by-product of ammonium chloride or amine salt by filtration, and the filtrate is freed of the solvent under reduced pressure to obtain the end product of silicon-containing copolymer.

This polymer is soluble in a general organic solvent such as hydrocarbon solvents (e.g., aliphatic hydrocarbons, alicyclic hydrocarbons and aromatic hydrocarbons), halogenated hydrocarbons, ethers, alcohols, esters and ketones. Baking of the thus-obtained base polymer in the atmosphere or in an atmosphere of an inert gas such as nitrogen or argon at a high temperature of, for example, 350° C. to 550° C. for 0.05 to 2.0 hours gives a cured product which is capable of resisting high temperatures, which has excellent mechanical properties and flexibility, which is almost or completely colorless and transparent, and which has a low relative dielectric constant.

The silicon-containing copolymer to be used as a base polymer in the invention has a number-average molecular weight of preferably 500 to 1,000,000. Because, in case where the number-average molecular weight of the silicon-containing copolymer is less than 500, the polymer has such a low viscosity that there result poor coating properties and, in case where the number-average molecular weight exceeds 1,000,000, the polymer has a poor stability, thus such polymer having bad handling properties. The number-average molecular weight of the silicon-containing copolymer is more preferably 800 to 100,000, still more preferably 1,000 to 10,000.

(Cross-Linking Agent)

As the cross-linking agent for cross-linking the base polymer, there are illustrated, for example, silicon-containing cross-linking agents and those compounds which generate an acid upon being heated.

Preferred examples of the silicon-containing cross-linking agent are:
(1) tetraisocyanatesilane represented by the general formula of $Si(NCO)_4$;
(2) triisocyanatesilane represented by the general formula of $R^{11}Si(NCO)_3$;
(3) tetraalkoxysilane represented by the general formula of $Si(OR^{12})_4$; and
(4) trialkoxysilane represented by the general formula of $R^{13}Si(OR^{14})_3$.

In the above formulae, $R^{11}$ represents an alkyl group, an aryl group, an alkenyl group, an aralkyl group or the like, and a methyl group, an ethyl group or a phenyl group is preferred. Also, $R^{12}$ and $R^{14}$ each independently represent an alkyl group, preferably a methyl group, an ethyl group or a butyl group. Further, $R^{13}$ represents a hydrogen atom, an alkyl group, an aryl group, an alkenyl group or the like, and a hydrogen atom, a methyl group, an ethyl group, a phenyl group or a vinyl group is preferred. These silicon-containing cross-linking agents may be used alone or in combination of two or more of them.

Specific typical examples of the above-described silicon-containing cross-linking agents include tetraisocyanatesilane, methyltriisocyanatesilane, ethyltriisocyanatesilane, phenyltriisocyanatesilane, vinyltriisocyanatesilane, tetramethoxysilane, tetraethoxysilane, tetrabutoxysilane, trimethoxysilane, triethoxysilane, tributoxysilane, methyltrimethoxysilane, methyltriethoxysilane, ethyltriethoxysilane, phenyltrimethoxysilane, phenyltriethoxysilane, vinyltriethoxysilane, etc., and tetraisocyanatesilane, methyltriisocyanatesilane, tetramethoxysilane and methyltrimethoxysilane are preferred.

Also, as the cross-linking agents composed of an acid-generating compound, peroxides having benzene rings whose main chain is constituted by highly heat-resistant benzene rings are preferred. Preferred examples of the benzene ring-containing peroxides include 3,3',4,4'-tetra(t-butylperoxycarbonyl)benzophenone, 4,4'-bis(t-butylperoxycarbonyl)benzophenone and 3,3'-bis(t-butylperoxycarbonyl)benzophenone. These acid-generating compounds may be used independently or in combination of two or more of them.

The amount of cross-linking agent to be used varies depending upon the intended degree of cross-linking, kind of the used cross-linking agent, the cross-linking temperature, and ambient atmosphere and, further, upon the amount of Si—H group in the base polymer. However, in the case of forming a cured product by once forming a solvent-soluble, cross-linked, silicon-containing copolymer, then baking the thus-formed solvent-soluble, cross-linked, silicon-containing copolymer, the amount of cross-linking agent is usually 0.1 to 20% by weight, preferably 0.5 to 10% by weight, based on the base polymer. Also, in the case of forming a cured product by baking to cause cross-linking and curing directly from the silicon-containing copolymer composition containing the cross-linking agent without once forming the solvent-soluble, cross-linked, silicon-containing copolymer, it suffices to use the cross-linking agent in about the same amount as that in obtaining the above-described solvent-soluble, cross-linked, silicon-containing copolymer.

(Cross-Linking Accelerator)

In order to accelerate the cross-linking, a cross-linking accelerator may be used in the silicon-containing copolymer composition, if necessary. As the cross-linking agent, those compounds are preferably used which generate an acid upon being heated or exposed to light. Therefore, the acid-generating compounds to be used as the cross-linking agents may be used as the cross-linking accelerators. As the compounds which generate an acid upon being heated or exposed to light, there are illustrated, for example, peroxyesters, peroxyketals and dialkylperoxides. Specific examples of these compounds include t-butylperoxybenzoate, 2,2-bis(4,4-di-t-butylperoxycyclohexyl)propane, di-t-butylperoxide and 3,3',4,4'-tetra(t-butylperoxycarbonyl)benzophenone which, however, do not limit the cross-linking accelerators to be used in the invention. These cross-linking accelerators are used in an amount of usually 0.01 to 20%, preferably 0.1 to 10%, based on the base polymer. It suffices for the cross-linking accelerator to be added to the polymer at an ordinary temperature.

(Solvent)

In the case of producing the solvent-soluble, cross-linked, silicon-containing copolymer by using the silicon-containing copolymer composition of the invention, the reaction between the base polymer and the cross-linking agent is conducted usually in a state wherein the base polymer and the cross-linking agent are dissolved in a solvent. Also, in the case of conducting cross-linking and curing using the silicon-containing copolymer composition of the invention without once forming the solvent-soluble, cross-linked, silicon-containing copolymer, there is a case where it is necessary to dissolve the base polymer and the cross-linking agent in a solvent before coating upon forming a coat of the composition onto a substrate or the like.

As the solvents to be used for dissolving the base polymer, the cross-linking agent and other additives, aromatic hydrocarbons such as benzene, toluene, xylene, ethylbenzene, diethylbenzene, trimethylbenzene and triethylbenzene; aliphatic hydrocarbons such as n-pentane, i-pentane, n-hexane, i-hexane, n-heptane, i-heptane, n-octane, i-octane, n-nonane, i-nonane, n-decane, i-decane and dipentene; alicyclic hydrocarbons such as cyclohexane, ethylcyclohexane, methylcyclohexane, cyclohexene, decahydronaphthalene and p-menthane; ethers such as dipropyl ether and dibutyl ether (DBE); ketones such as methyl isobutyl ketone (MIBK); esters such as butyl acetate, cyclohexyl acetate, butyl stearate and ethyl lactate; ethylene glycol monoalkyl ethers such as ethylene glycol monomethyl ether and ethylene glycol monoethyl ether; ethylene glycol monoalkyl ether acetates such as ethylene glycol monomethyl ether acetate and ethylene glycol monoethyl ether acetate; propylene glycol monoalkyl ethers such as propylene glycol monomethyl ether and propylene glycol monoethyl ether; or propylene glycol monoalkyl ether acetates such as propylene glycol monomethyl ether acetate (PGMEA) and propylene glycol monoethyl ether acetate are preferably used. Of these, aromatic hydrocarbons such as xylene, ethers such as DBE and PGMEA are particularly preferred. These solvents may be used independently or in combination of two or more of them. The amount of the solvent to be used varies depending upon purpose of the use of the silicon-containing copolymer composition or the solvent-soluble, cross-linked, silicon-containing copolymer or upon kind of the base polymer, but any amount may be employed as long as the aforesaid composition or the polymer can be applied to a substrate.

(Cross-Linking Conditions)

As has been described hereinbefore, the reaction conditions for producing the solvent-soluble, cross-linked, silicon-containing copolymer vary depending upon the base polymer, the cross-linking agent and the reaction solvent to be used and kinds of the additives such as the cross-linking accelerator and use or non-use thereof. However, the reaction is conducted at a temperature of usually −20° C. to 100° C., preferably 10 to 100° C., more preferably 30 to 90° C. for a period of usually 0.05 to 5 hours, preferably 1 to 3 hours.

(Film-Forming and Baking Conditions)

The solvent-soluble, cross-linked, silicon-containing copolymer, which is a reaction product between the base polymer and the cross-linking agent, is usually dissolved in the solvent illustrated above to give a proper viscosity, followed by coating on a substrate according to a conventionally well-known method such as a spin-coating method, a bar-coating method, a roll-coating method or a dip-coating method. With the conventional base polymer film, curing of the film requires baking at a temperature as high as about 400° C. However, the film of the base polymer of the invention having been reacted with the cross-linking agent can be cured at a temperature of 300° C. or less to form a hard coating film which is heat-resistant, which has a large mechanical strength, which is colorless and transparent even when heated in the atmosphere, and which has a low relative dielectric constant. As has been described hereinbefore, the curing temperature is usually 150° C. or higher, more preferably 200° C. or higher, still more preferably about 250° C. Also, the silicon-containing copolymer composition or the solvent-soluble, cross-linked, silicon-containing copolymer composition of the invention can give a film itself when coated on, for example, a glass substrate to form a cross-linked cured film and stripped from the glass substrate. This film is a film which resists a high temperature, which has excellent mechanical properties and flexibility, which is almost or completely colorless and is excellent in transparency, and which has a low relative dielectric constant. This baking temperature applies not only to curing of the film of the solvent-soluble, cross-linked, silicon-containing copolymer in accordance with the invention but also to the case of the copolymer being used in other form than the film or in a state of not being dissolved in a solvent, or to the case where the silicon-containing copolymer composition of the invention is directly cured.

The thus-obtained coat or film may be utilized as a dielectric layer for PDP back panel or front panel, a material for PDP rib (partition) and PDP vacuum sealer, an interlayer dielectric film in semiconductor elements, a front display panel of display elements, a PMD material adapted for a 600° C. low-temperature process and a wire-coating layer. Also, the base polymer of the invention having been reacted with the cross-linking agent can be utilized as an optical fiber material, an adhesive, a composite material with ceramics and a material for heat-resistant threads.

Further, since the resultant film is also excellent in chemical resistance such as alkali resistance, a portion of an ink jet printer which portion comes into contact with a strongly alkaline ink jet ink can be protected from the strongly alkaline solution by forming the film as a protective film on the portion. It is also possible to constitute a member which is required to have an alkali resistance by a cured product of the composition or the solvent-soluble, cross-linked, silicon-containing copolymer of the invention. Also, the reaction product between the base polymer and the cross-linking agent can be formed in a thickness of 20 to 100 μm per one coating procedure. Thus, thickness of the coat formed by one coating procedure can be made larger than in the case of using a base polymer not having been reacted with a cross-linking agent. Therefore, the reaction product is adapted for formation of an interlayer dielectric film or a dielectric film of PDP which is required to have a large film thickness.

One embodiment of using the cured product of the solvent-soluble, cross-linked, silicon-containing copolymer in accordance with the invention for FPD is briefly explained below by reference to FIG. 1, taking production of PDP for instance.

(1) Formation of a Front Substrate of a Plasma Display Panel Having a Dielectric Layer 4 of the Silicon-Containing Copolymer:

As a front substrate 1 of an AC plasma display panel, common soda-lime glass or high strain point glass is used. Transparent electrodes 2 (ITO membrane) are patternwise provided on one side of the glass facing a back substrate 10 by sputtering. Then, on the transparent electrodes, highly conductive bus electrodes 3 (for example, silver electrodes of a thick film material formed by printing, aluminum electrodes formed by vacuum deposition or a Cr/Cu/Cr electrode formed by sputtering) are patternwise provided. The solvent-soluble, cross-linked, silicon-containing copolymer of the invention is coated all over these electrodes 3, followed by baking at 250° C. for 60 minutes to form a dielectric layer 4. Further, after forming a sealing layer not shown by printing or the like, the surface of the dielectric layer is covered with a MgO protective layer 5 by, for example, vacuum deposition.

(2) Formation of a Back Substrate of the Plasma Display Panel Having a Dielectric Layer 7 of the Silicon-Containing Copolymer:

On a back glass substrate 10 is generally provided a passivation film of silicon oxide and, on this passivation film, stripe-shaped address electrodes 8 are formed by a printed thick silver paste or a thick aluminum paste or by a sputtered film of Cr—Cu—Cr in such manner that they cross at right angles with the transparent electrodes 2, followed by coating the solvent-soluble, cross-linked, silicon-containing copolymer in accordance with the invention all over the back substrate so as to cover the electrodes and curing it in the same manner as in producing the dielectric layer 4 described above to form the dielectric layer 7. Further, a number of partitions (ribs) 6 are formed adjacent to and parallel to the electrodes 8, with red, blue and green fluorescent bodies 9 being formed in respective cells above the address electrodes 8 and along the side surface of each of the ribs 6. Then, a sealing layer not shown is formed.

However, since the dielectric layer 7 functions as both an insulating layer for preventing leakage between electrodes and a reflective plate for improving luminance upon discharge, it is preferred to incorporate therein a proper inorganic pigment or inorganic filler for improving luminance. Incorporation of the inorganic pigment or the like in the dielectric layer may be conducted by adding it in a proper amount to the silicon-containing copolymer.

(3) Assembling of a Plasma Display Panel:

A plasma display panel is obtained by assembling the thus produced front plate and the back plate and, after evacuation, enclosing a gas therein.

A dielectric layer excellent in transparency, plane properties, heat resistance and mechanical strength and low in dielectric constant is formed on the electrode film by baking the solvent-soluble, cross-linked, silicon-containing polymer. Additionally, in the case of forming the conductive film all over the substrate by vacuum deposition or the like, an electrode having a desired pattern can be formed by patterning using photoresist or the like and then etching the conductive film. Also, although both dielectric layers on the front substrate and on the back substrate are formed by using the solvent-soluble, cross-linked, silicon-containing copolymer of the invention in the above-described embodiment, either of them may be formed by using the silicon-containing copolymer. Also, the partitions may be formed by using the solvent-soluble, cross-linked, silicon-containing copolymer of the invention.

BEST MODE FOR CARRYING OUT THE INVENTION

The invention is described in more detail by reference to Examples that, however, do not limit the invention in any way.

PRODUCTION EXAMPLE

The atmosphere of a reaction vessel placed in a thermostatic chamber was replaced by dry nitrogen, and a solution of 47 g (0.222 mol) of phenyltrichlorosilane ($PhSiCl_3$), 56 g (0.222 mol) of diphenyldichlorosilane ($Ph_2SiCl_2$), 3.8 g (0.033 mol) of methyldichlorosilane ($MeSiHCl_2$) and 50 g (0.19 mol) of 1,4-bis(dimethylchlorosilyl)benzene in 1000 ml of xylene was charged into the reaction vessel. Subsequently, the temperature inside the reaction vessel was set at −5° C. and, after the temperature reached the predetermined level, a solution of 13.0 g (0.7222 mol) of water ($H_2O$) in 1000 ml of pyridine was poured into the reaction vessel at a rate of about 30 ml/min. Upon pouring the solution, reaction between halosilane and water took place, and the temperature in the vessel increased to −2° C. After completion of pouring the mixed solution of water and pyridine, stirring was continued for 1 hour. Thereafter, in order to completely react unreacted chlorosilane, ammonia was introduced thereinto at a rate of 2 Nl/min for 10 minutes, followed by stirring. After completion of the reaction, dry nitrogen was blown through the reaction solution to remove unreacted ammonia, and the solution was press-filtered under nitrogen atmosphere to obtain about 2,300 ml of a filtrate. The solvent of this filtrate was replaced under reduced pressure to obtain 100 g of a colorless, transparent, viscous resin (base polymer).

The thus-obtained resin had a number-average molecular weight of 2,200. IR spectrum analysis of the resin revealed an absorption at a wave number of 3350 $cm^{-1}$ based on N—H group; an absorption at a wave number of 2160 $cm^{-1}$ based on Si—H; an absorption at a wave number of 1140 $cm^{-1}$ based on Si—Ph group; an absorption in the range of wave numbers of 1060 to 1100 $cm^{-1}$ based on Si—O; an absorption in the range of wave numbers of 1020 to 820 $cm^{-1}$ based on Si—H and Si—N—Si; absorptions at wave numbers of 3140, 2980 and 1270 $cm^{-1}$ based on C—H; and absorptions at wave numbers of 810 and 780 $cm^{-1}$ based on C—H of benzene ring.

Further, measurement of $^1$H-NMR spectrum of this polymer revealed absorptions of δ 7.2 ppm (br, $C_6H_5$), δ 4.8 ppm (br, SiH), δ 1.4 ppm (br, NH) and δ 0.3 ppm (br, $SiCH_3$).

Additionally, the thus-obtained polymer was coated on a glass substrate in a thickness of 50 microns and cured in the atmosphere at 400° C. for 1 hour or cured in a nitrogen atmosphere at 500° C. for 1 hour to measure percent transmission and relative dielectric constant for each curing condition. As a result, no cracks and no delamination were found, and the percent transmission and the relative dielectric constant were found to be 98% or more and 2.8, respectively.

Example 1

10 g of the base polymer obtained in the above Production Example was diluted to about 40% with xylene, and tetraisocyanatesilane was added thereto in an amount of 5% by weight (0.5 g) based on the polymer, followed by stirring at a temperature of about 60° C. for 1 hour to react. The reaction solution was filtered through a 0.2-μm syringe filter, and the polymer was found to have a number-average molecular weight of 2,300 by GPC, which scarcely changed from that of the starting base polymer. Examination on bond condition by FT-IR revealed a peak near 2300 $cm^{-1}$ which is not observed with the base polymer. From the wave number, this peak was considered to be a peak based on isocyanate group. Addition of isocyanate group was confirmed by this result of FT-IR.

Then, the reaction solution was coated on a silicon wafer by spin coating in a thickness of about 800 nm. Subsequently, the silicon wafer having coated thereon the reaction solution was treated in a muffle furnace in the atmosphere at 250° C. for 60 minutes to cure the coat. The coat density, relative dielectric constant and solvent resistance of the resultant coat formed on the silicon wafer were examined. The solvent resistance was evaluated according to the following method. As a result, the coat density, relative dielectric constant and solvent resistance were found to be 1.30, 2.73 and 100%, respectively. The evaluation result on cured coat shows that the cured coat has an excellent solvent resistance.

(Method for Evaluating Solvent Resistance)

A cured coat is dipped in xylene for 5 minutes, thickness of the coat is measured before and after dipping, and the coat-remaining ratio in terms of thickness is taken as the solvent resistance. In this test, insufficient curing leads to dissolution of the cured coat into an organic solvent.

Comparative Example 1

Coat samples were prepared in the same manner as in Example 1 using the base polymer produced in the foregoing Production Example but not using any cross-linking agent, by changing curing temperature. Physical properties of the coat samples were measured. The results thus obtained are shown in Table 1. It is seen from the evaluation results that the base polymer fails to provide a sufficient solvent resistance even when cured at 350° C.

TABLE 1

| | Coat Density (g/cm³) | Relative Dielectric Constant | Solvent Resistance (%) |
|---|---|---|---|
| 250° C. | 1.24 | 2.89 | 54 |
| 300° C. | 1.22 | 2.88 | 86 |
| 350° C. | 1.25 | 2.88 | 94 |
| 400° C. | 1.30 | 2.95 | 100 |

Comparison of Example 1 with Comparative Example 1 reveals that, by the addition reaction with the cross-linking agent, the curing temperature can be lowered to 250° C. without changes in other physical properties. It is seen from evaluation of Comparative Example 1 that the base polymer is not sufficiently cured even by curing at 350° C. On the other hand, the polymer containing the cross-linking agent undergoes sufficient curing at 250° C. That is, addition of the cross-linking agent enables sufficient curing at lower temperatures.

Examples 2 to 7

The base polymer was reacted with a cross-linking agent in the same manner as in Example 1 except for changing kind and amount of the cross-linking agent to those shown in Table 2. Also, the number-average molecular weight of each of the resultant polymers was measured in the same manner as in Example 1. The results thus obtained are shown in Table 2.

Further, the resultant reaction solutions were subjected to the same curing condition as in Example 1, and density, relative dielectric constant and solvent resistance of each of the cured coats were evaluated in the same manner as in Example 1. The results are shown in Table 3.

TABLE 2

| | Cross-linking Agent | Added Amount (wt %) | Number-Average Molecular Weight |
|---|---|---|---|
| Example 1 | Tetraisocyanatesilane | 5 | 2300 |
| Example 2 | Tetraisocyanatesilane | 10 | 2350 |
| Example 3 | Methyltriisocyanatesilane | 5 | 2250 |
| Example 4 | Tetramethoxysilane | 5 | 2260 |
| Example 5 | Tetramethoxysilane | 10 | 2300 |
| Example 6 | Tetramethoxysilane | 15 | 2350 |
| Example 7 | Methyltrimethoxysilane | 5 | 2250 |

TABLE 3

| | Coat Density (g/cm³) | Relative Dielectric Constant | Solvent Resistance (%) |
|---|---|---|---|
| Example 1 | 1.30 | 2.73 | 100 |
| Example 2 | 1.29 | 3.11 | 100 |
| Example 3 | 1.31 | 2.88 | 100 |
| Example 4 | 1.27 | 2.89 | 100 |
| Example 5 | 1.23 | 2.89 | 100 |
| Example 6 | 1.22 | 2.88 | 98 |
| Example 7 | 1.26 | 2.89 | 100 |

These cured coats obtained in Examples 1 to 7 had a heat resistance of 600° C. in nitrogen, a colorless, 99.5% transparency (550 nm), a high etching resistance and a high alkali resistance. Also, the cured coats of the Examples generated no gases when heated to 400° C. or above under reduced pressure.

Example 8

10 g of the base polymer obtained in the foregoing Production Example was adjusted to about 40% with xylene, and 0.5 g of BTTB (3,3',4,4'-tetra(t-butylperoxycarbonyl)-benzophenone) was added thereto, followed by stirring at room temperature to mix. After mixing, the mixed solution was filtered through a 0.2-μm syringe filter, and the polymer was found to have a number-average molecular weight of 2,250 by GPC, which scarcely changed from that of the starting base polymer.

Subsequently, the mixed solution was coated on a silicon wafer in a thickness of about 800 nm by spin-coating. Then, the mixed solution-coated silicon wafer was treated in a muffle furnace in the atmosphere at 250° C. for 60 minutes to cure the coat. The thus-obtained coat on the silicon wafer was evaluated in the same manner as in Example 1 with respect to coat density, relative dielectric constant and solvent resistance. As a result, the coat density, relative dielectric constant and the solvent resistance were found to be 1.32, 2.80 and 100%, respectively. The evaluation result on cured coat shows that the cured coat has an excellent solvent resistance.

Examples 9 to 12

Cured coats were obtained under the same conditions as in Example 8 except for changing the addition amount of BTTB, and were evaluated with respect to the coat density, relative dielectric constant and solvent resistance. The results thus obtained are shown in Table 4.

TABLE 4

| | Amount of Added BTTB (% by weight) | Coat Density (g/cm³) | Relative Dielectric Constant | Solvent Resistance (%) |
|---|---|---|---|---|
| Example 8 | 5 | 1.82 | 2.80 | 100 |
| Example 9 | 0.1 | 1.25 | 2.85 | 65 |
| Example 10 | 0.5 | 1.28 | 2.84 | 98 |
| Example 11 | 1.0 | 1.30 | 2.82 | 100 |
| Example 12 | 10.0 | 1.31 | 2.85 | 100 |

It is seen from Table 4 that the amount of the cross-linking agent to be added is desirably 0.5% by weight or more in consideration of the curing result. As to the upper limit, the amount is suitably 10% by weight or less in view of heat resistance.

Example 13

Percent Transmission in the Visible Region

The reaction solution obtained in Example 1 was spin-coated in a thickness of 10 μm on a quartz substrate, and was treated in the atmosphere at 250° C. for 60 minutes. The percent transmission of the thus-obtained coat was measured by means of an ultraviolet (UV) rays-visible light spectrophotometer. The percent transmission in the visible region (wave length: 400 nm to 800 nm) was found to be 98%, which shows an extremely excellent transparency.

Examples 14 to 24

Coats were formed in the same manner as in Example 13 except for using the reaction solutions of Examples 2 to 12, respectively, and were subjected to measurement of the percent transmission thereof in the same manner as in Example 13 using the ultraviolet rays-visible light spectrophotometer. The results thus obtained are shown in Table 5.

TABLE 5

| | Reaction Solution | Percent Transmission (400 to 800 nm) % |
|---|---|---|
| Example 13 | Reaction Solution of Example 1 | 98 |
| Example 14 | Reaction Solution of Example 2 | 97.5 |
| Example 15 | Reaction Solution of Example 3 | 98 |
| Example 16 | Reaction Solution of Example 4 | 98 |
| Example 17 | Reaction Solution of Example 5 | 98 |
| Example 18 | Reaction Solution of Example 6 | 97.5 |
| Example 19 | Reaction Solution of Example 7 | 98 |
| Example 20 | Reaction Solution of Example 8 | 98 |
| Example 21 | Reaction Solution of Example 9 | 98 |
| Example 22 | Reaction Solution of Example 10 | 98 |
| Example 23 | Reaction Solution of Example 11 | 98 |
| Example 24 | Reaction Solution of Example 12 | 97.5 |

It is seem from the results of these Examples and Comparative Examples that the silicon-containing copolymer composition or the solvent-soluble, cross-linked, silicon-containing copolymer obtained by cross-linking the composition, both of which are in accordance with the invention, permits to conduct curing at a temperature much lower than 400° C. which is employed in curing a cross-linking agent-free base polymer, for example at 250° C. It is also seen that there can be obtained completely cured coats which possess physical properties not inferior to, or even superior to, those of the cured products of the base polymer cured at 400° C. without using any cross-linking agent. Thus, it becomes possible to use the silicon-containing copolymer in a wider field of use including FPD.

ADVANTAGES OF THE INVENTION

As has been described hereinbefore, the invention enables one to obtain a cured product which has a high heat resistance, a high light transmission, a low relative dielectric constant and a high chemical resistance and which has a strong mechanical strength and a good flexibility, by curing even at a low temperature in the atmosphere. Also, no gases are generated even when heated to 400° C. or above under reduced pressure, which enables application to a process for producing PDP dielectric layer. Thus, the invention eliminates the necessity for setting special conditions such as nitrogen atmosphere and high temperature upon curing, and enables production of a cured product at a low cost. In addition, the invention enables industrial uses of the silicon-containing copolymer in a wider field of use.

What is claimed is:

1. A silicon-containing copolymer composition, which comprises a silicon-containing copolymer having a number-average molecular weight of 500 to 1,000,000 and containing at least the structural units represented by the following general formulae (I) and (II) and a cross-linking agent:

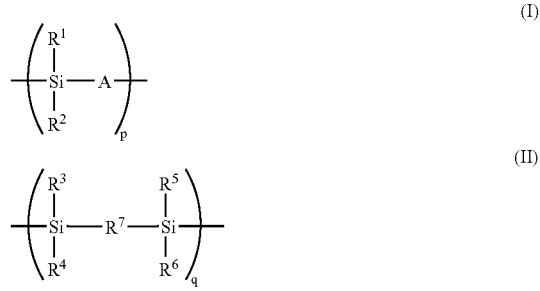

wherein $R^1$, $R^2$, $R^3$, $R^4$, $R^5$ and $R^6$ each independently represents an alkyl group, an alkenyl group, a cycloalkyl group, an aryl group, an aralkyl group, an alkylamino group, an alkylsilyl group or an alkoxy group, $R^7$ represents a divalent group, and A represents NH or O, with the order of the structural units (I) and (II) being at random, and the molar ratios p and q thereof respectively being an optional number except for zero, and the proportions of Si—O bond and Si—N bond in the copolymer satisfying the following equation:

$$\text{Si—O}/(\text{Si—N}+\text{Si—O})=0.01 \text{ to } 0.99.$$

2. The silicon-containing copolymer composition as described in claim 1, wherein the silicon-containing copolymer further contains at least one of the structural units represented by the following general formulae (III) and (IV):

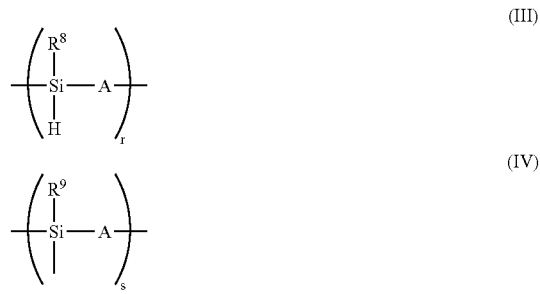

wherein $R^8$ and $R^9$ each independently represents an alkyl group, an alkenyl group, a cycloalkyl group, an aryl group, an aralkyl group, an alkylamino group, an alkylsilyl group or an alkoxy group, and A represents NH or O, with the order of the structural units (I) to (IV) in the polymer being at random, and the molar ratios thereof, p, q, r and s satisfying the following equation:

$$q/(p+q+r+s)=0.01 \text{ to } 0.99.$$

3. The silicon-containing copolymer composition as described in claim 1, wherein the silicon-containing copolymer further contains at least one of the structural units represented by the following general formulae (V), (VI) and (VII):

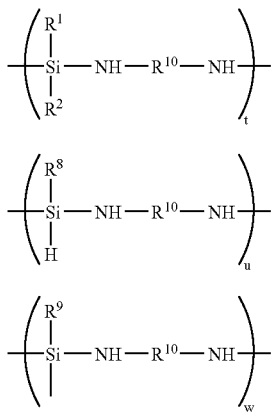

(V)

(VI)

(VII)

wherein $R^1$, $R^2$, $R^8$ and $R^9$ each independently represents an alkyl group, an alkenyl group, a cycloalkyl group, an aryl group, an aralkyl group, an alkylamino group, an alkylsilyl group or an alkoxy group, $R^{10}$ represents a divalent aromatic group, with the order of the structural units (V) to (VII) in the polymer being at random, and t, u and w respectively being an optional number except for zero.

4. The silicon-containing copolymer composition as described in claim 3, wherein $R^{10}$ is a divalent aromatic group selected from the group consisting of an aralkylene group, a naphthylene group or a group represented by the following general formula (A):

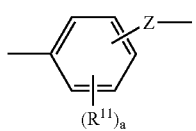

(A)

wherein $R^{11}$ represents a halogen atom or a lower alkyl group, a represents an integer of 0 to 4, and Z represents a direct bond or a group represented by the following general formula (B):

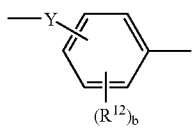

(B)

wherein $R^{12}$ represents a halogen atom or a lower alkyl group, b represents an integer of 0 to 4, and Y represents a direct bond or a divalent group.

5. The silicon-containing copolymer composition as described in claim 1, wherein the cross-linking agent is a silicon-containing cross-linking agent.

6. The silicon-containing copolymer composition as described in claim 5, wherein the silicon-containing cross-linking agent is at least one member selected from among tetraisocyanatesilane, triisocyanatesilane, tetraalkoxysilane and trialkoxysilane.

7. The silicon-containing copolymer composition as described in claim 1, which further contains a cross-linking accelerator.

8. The silicon-containing copolymer composition as described in claim 1, wherein the cross-linking agent is a compound which generates an acid upon being heated.

9. The silicon-containing copolymer composition as described in claim 8, wherein the compound which generates an acid upon being heated is a peroxide having a benzene ring or rings.

10. The silicon-containing copolymer composition as described in claim 9, wherein the peroxide is 3,3',4,4'-tetra (t-butylperoxycarbonyl)benzophenone or the derivative thereof.

11. A cross-linked, silicon-containing copolymer formed by heating the silicon-containing copolymer composition described in claim 1.

12. The cross-linked, silicon-containing copolymer as described in claim 11, wherein the cross-linked silicon-containing copolymer is solvent-soluble.

13. A process for curing a silicon-containing copolymer, which comprises heating the silicon-containing copolymer composition described in claim 1 at a temperature of 150° C. or higher.

14. A process for curing the solvent-soluble, cross-linked, silicon-containing copolymer described in claim 12, which comprises coating a solvent solution of the solvent-soluble, cross-linked, silicon-containing copolymer on a substrate, and heating at a temperature of 150° C. or higher.

15. A film or coat formed by heat-curing according to the process described in claim 13.

16. A plasma display which has a cross-linked cured product of the silicon-containing copolymer composition described in claim 1 as a dielectric layer, a partition (rib layer) and/or a vacuum sealer.

17. A liquid crystal display which has a cross-linked cured product of the silicon-containing copolymer composition described in claim 1 as an interlayer dielectric film and/or an oriented film.

18. The silicon-containing copolymer composition as described in claim 2, wherein the silicon-containing copolymer further contains at least one of the structural units represented by the following general formulae (V), (VI) and (VII):

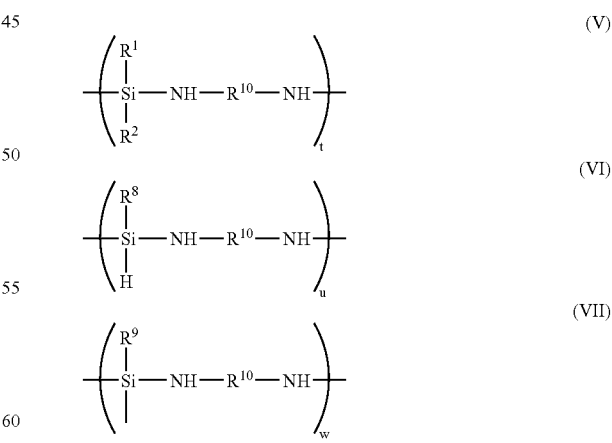

wherein $R^1$, $R^2$, $R^8$ and $R^9$ each independently represents an alkyl group, an alkenyl group, a cycloalkyl group, an aryl group, an aralkyl group, an alkylamino group, an alkylsilyl group or an alkoxy group, $R^{10}$ represents a divalent aromatic group, with the order of the structural units (V) to (VII) in the polymer being at random, and t, u and w respectively being an optional number except for zero.

19. The silicon-containing copolymer composition as described in claim 18, wherein $R^{10}$ is a divalent aromatic group selected from the group consisting of an aralkylene group, a naphthylene group or a group represented by the following general formula (A):

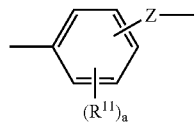

(A)

wherein $R^{11}$ represents a halogen atom or a lower alkyl group, a represents an integer of 0 to 4, and Z represents a direct bond or a group represented by the following general formula (B):

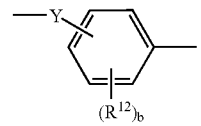

(B)

wherein $R^{12}$ represents a halogen atom or a lower alkyl group, b represents an integer of 0 to 4, and Y represents a direct bond or a divalent group.

* * * * *